INVENTOR
DAVID A. VIGIL
BY Samuel Cole
ATTORNEY

INVENTOR
DAVID A. VIGIL
BY Samuel Cohen
ATTORNEY

United States Patent Office 3,478,262

Patented Nov. 11, 1969

3,478,262

METHOD OF SPACING A PLURALITY OF MAGNETIC HEADS FROM THE SURFACE OF A MAGNETIC DRUM

David A. Vigil, Woodland Hills, Calif., assignor to RCA Corporation, a corporation of Delaware Filed June 30, 1967, Ser. No. 650,402
Int. Cl. G01r *33/00*; G11b *5/00*
U.S. Cl. 324—34 2 Claims

ABSTRACT OF THE DISCLOSURE

The spacing between an inductive element, such as a magnetic head, and a surface, such as that of a magnetic drum, is adjusted by measuring an inductively related parameter, such as inductive reactance, of the element. A set of graphs is first prepared using reference heads having different values of free space inductance. Then the free space inductance of the particular head it is desired to adjust relative to the drum is determined and the prepared graph corresponding to that free space inductance is used in adjusting the head.

BACKGROUND OF THE INVENTION

It has ben found in the operation of certain types of drum memories that the magnetic heads must be spaced no closer than a given distance (0.850 mil, that is, 0.850 $\times 10^{-3}$ inches, in one particular case) from the drum rotor. The reason is that when the rotor is brought up to operating speed, the spacing between the heads and the rotor surface does not remain absolutely uniform. Even though the drum is a high precision apparatus, there is a certain amount of play in the bearings, a certain amount of non-uniformity in the shape of the rotor itself and a measurable amount of centrifugal growth. If the heads initially are too close to the drum rotor, it is possible for head-to-rotor "run-ins" to occur during drum operation and these are catastrophic and cause considerable "down-time" on the computer associated with the drum.

The object of this invention is to provide a means for very accurately ascertaining the spacing between an element, such as a head, and a surface, such as that of a drum, to permit adjusting this spacing to a desired value with a high degree of reliability and repeatability.

SUMMARY OF THE INVENTION

In accordance with the present invention, there is established for a reference object which is physically similar to and which has a similar value of free space inductance as the object it is desired to position, the relationship between a given inductively related parameter thereof and its spacing from said surface. The spacing between the object it is desired to position and the surface is then adjusted while measuring the same inductively related parameter thereof until the value of said parameter indicative of the desired spacing is achieved.

DETAILED DESCRIPTION

Figure 1:
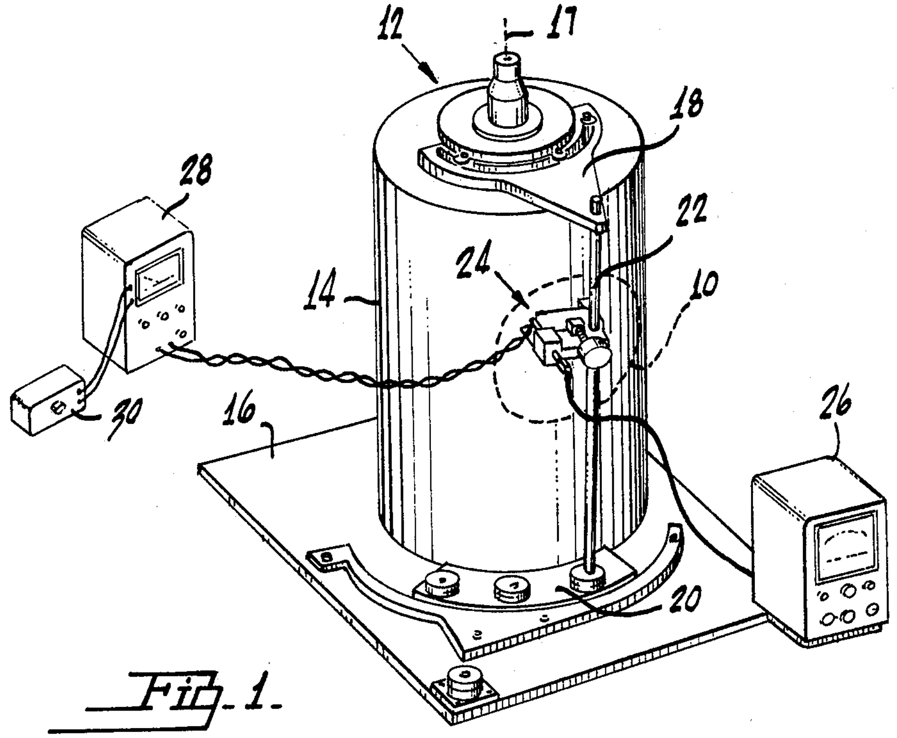
FIGURE 1 is a perspective showing of a drum and the instruments employed in ascertaining the spacing between a magnetic head and the drum rotor.

The apparatus of FIGURE 1 includes a drum memory shown generally at 12 and comprising housing 14 supported on a base 16. A stator is located within the housing and the magnetic heads are adjustably mounted in this stator. The drum rotor (not visible in FIGURE 1) is located within the stator and it rotates about the vertical axis 17. The pole pieces (not visible) of the heads are located immediately adjacent to the magnetic surface of the rotor and are capable of "writing" on and "reading" from this surface in a manner well understood in the art.

During the initial adjustment of the heads, a fixture comprising a support 18 which is fixed to the drum housing and the second support 20 which is fixed to the baseplate is positioned as shown. A rod 22 is rigidly secured at its opposite ends to the supports 18 and 20. A head adjusting and measuring apparatus, shown generally at 24, and shown in more detail in FIGURE 2, may be slid along the rod 22 until it aligns with a head and, when making an adjustment, fixed to the rod 22.

The head positioning procedure of the invention requires first that certain reference curves (shown in FIGURE 3 and discussed later) be drawn. There are a number of instruments employed in obtaining the readings needed to plot these curves. One, shown at 26, is a highly precise electronic gaging instrument such as a Brown and Sharpe Electronic Gaging System, Model 599–961 and including a Cartridge Gage Head Model 599–982. The second, shown at 28, is a means for measuring an inductively related parameter such as the inductance L or the impedance $[R^2+(\omega L)^2]^{1/2}$ of the magnetic head, where R is the head resistance, L is the head inductance and $\omega$ is the angular frequency at which the inductance is measured. The instrument 28 may be, for example, a Bruel and Kjaer Deviation Bridge, Type 1506. The instrument 30 shown connected to the impedance measuring instrument 28 is a precise inductance standard such as a General Instrument Standard Model 107–K.

Figure 2:
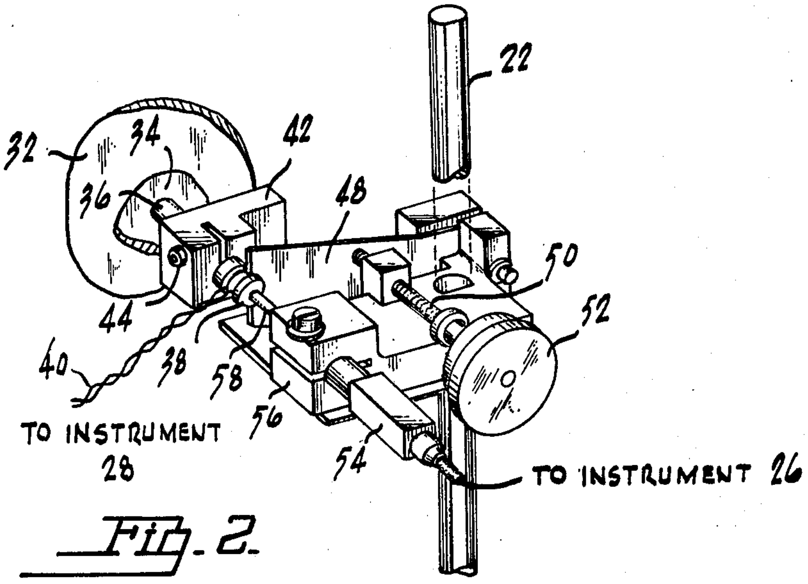
FIGURE 2 is an enlarged, partially broken-away view of the region 10 of FIGURE 1.

FIGURE 2 shows some of the details of the magnetic head and its means of adjustment. The drum stator 32 is partially broken away to show the drum rotor 34. The magnetic head which it is desired to adjust is shown at 36. The pole pieces of the head are spaced a very small distance from the surface of the rotor 34. The rear of the head is shown at 38. The two wires leading to the head are shown schematically at 40.

The head is normally securely held in place in the head clamping block 42 which is part of the drum structure. When it is desired to adjust the spacing between the head and the drum rotor surface, the clamping screw 44 may be loosened and the head moved toward or away from the drum surface. The means for effecting such movement includes a bent spring plate 48 which engages the magnetic head 36 at the free end of the plate 48 and which is clamped at its opposite end by the fixture 56. A precision, micrometer-type threaded member 50 and knob 52 are employed to move the plate 48 and, in response to such movement, the head 36 also is moved either toward or away from the rotor surface depending upon the direction in which the knob 52 is turned.

The sensing element of the distance measuring apparatus 26 consists of a cartridge 54. This cartridge is supported by the fixture 56 and the spindle 58 of the cartridge, which is movable relative to the body of the cartridge, abuts the rear surface of the magnetic head whose position it is desired to adjust. As explained in instruction manual for this instrument, an iron core is attached to this spindle. This core is centered between two coils which form part of a bridge. If the bridge is initially balanced and the core is moved axially, the bridge becomes unbalanced, and a meter reading is obtained which is proportioned to the amount of core movement.

To obtain the readings used in making the reference curves, first the head 36 is backed away from the drum rotor a distance sufficient that further movement of the head from the rotor results in no further change in the head inductance. It is found that this occurs at a rotor to head spacing of about 1.5 mils. In other words, the free space inductance of the head is about the same as its inductance when spaced 1.5 or more mils from the rotor surface.

After the measurement above and while the drum rotor is stationary, the position of the magnetic head is adjusted to a point such that the head touches the rotor surface. In this position, the spindle 58 of the gage head cartridge 54 is placed against the back surface 38 of the head 36 and the distance measuring instrument 26 is zeroed (the bridge is balanced). The leads 40 remain connected to the impedance measuring instrument 28 and its meter is nulled by adjusting the inductance standard 30.

Now the knob 52 is rotated until the distance measuring instrument 26 indicates the head 36 is spaced 0.500 mil from the rotor surface. At this time, a reading is taken on the meter of the impedance measuring instrument 28. This reading may be some arbitrary number such as 50 which is proportional to the magnetic head impedance $[R^2+(\omega L)^2]^{1/2}$. Since the internal resistance of the magnetic head does not change, it is clear the meter reading is also proportional to the inductive reactance $\omega L$ and this, in turn, is proportional to the head inductance L. In a number of the claims, the term "inductively related parameter" is employed and it is intended to be generic to inductance, inductive reactance or an impedance such as $[R^2+(\omega L)^2]^{1/2}$.

After the inductance reading is taken at a head to rotor spacing of 0.500 mil, the head position is adjusted to 0.600 mil as indicated on the distance measuring instrument 26, and a new reading is taken from the impedance measuring instrument 28. This procedure is repeated at increments of 0.100 mil until a spacing of about 1.000 mil is reached. Then a graph is drawn of head-to-drum spacing versus the reading taken from the impedance measuring instrument.

Figure 3:
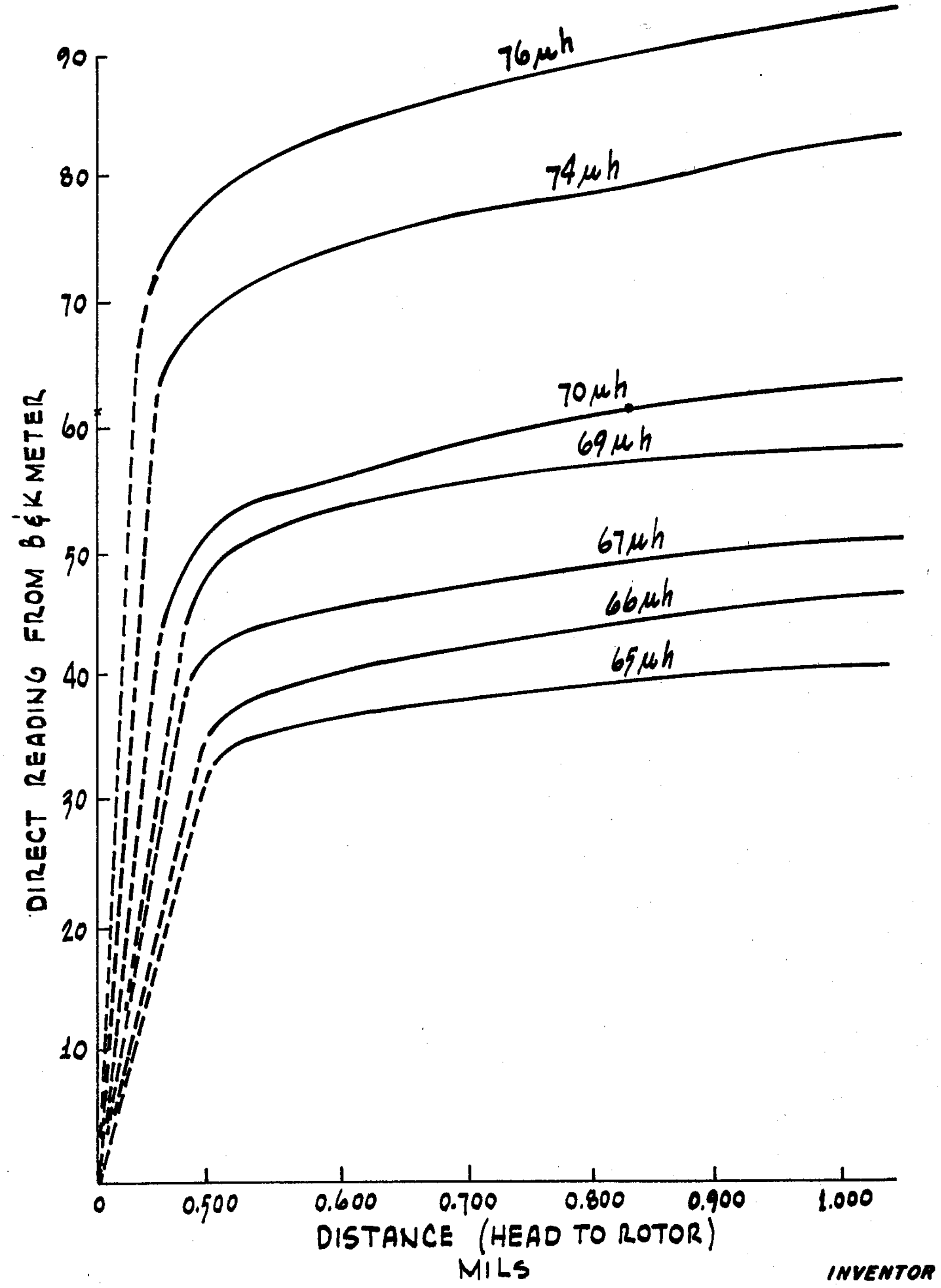
FIGURE 3 is a graph illustrating the variation of an inductively related parameter of various heads to the spacing of the heads from the rotor surface.

In practice, the free space inductance of a production run head may have an actual value which differs from its nominal value by as much as plus or minus 10%. It is desirable, in practicing the present invention, to first plot curves such as discussed above for a number of such heads of different value. A group of such curves is shown in FIGURE 3. These curves are all fairly similar in shape but are displaced from one another in the direction of the impedance or Y axis. The actual (measured) free space inductance of a head appears as a legend adjacent to the curve to which it corresponds.

After the curves shown in FIGURE 3 have been drawn, it becomes possible to adjust the spacing between any read-write head and the drum surface merely with the aid of the impedance measuring instrument 28. The distance measuring equipment including the instrument 26 and cartridge head 54 is not needed. It is necessary only to connect the magnetic head leads to the impedance measuring instrument 28, to determine, with the aid of this instrument, what the free-space inductance of this head is so that the proper one of the curves of FIGURE 3 may be chosen, and then to adjust the spacing between the magnetic head 36 and the drum rotor until a predetermined reading is obtained on the meter. For example, if it is desired to position a 70 $\mu$h. (microhenry) head 0.850 mil from the rotor surface, the head position is adjusted until a meter reading of 62 is obtained, as should be clear from FIGURE 3.

A set of curves such as shown in FIGURE 3, once established, may be employed for any drum. However, here too in a production run of drums the magnetic film thickness on the surface of the drum rotor may not be the same from one drum to another. This affects the readings on the meter of the impedance measuring instrument 28. It may therefore be necessary initially to check one or two heads with both the distance measuring instrument 26 and the impedance measuring instrument 28 to determine whether or not the curves for these heads are offset from the corresponding curves of FIGURE 3 and, if so, the amount and direction of the offset. Once this is determined, all of the remaining curves can be offset a corresponding amount in the same direction and the newly developed curves employed in the same manner as already discussed.

While the invention has been discussed in terms of the positioning of magnetic heads relative to a drum surface, it is to be understood that the invention is applicable to other areas as well. It may be employed in connection with other memory systems as, for example, discs and tapes and in fact, can be employed as an electronic caliper. In the latter use, the fixed element of the caliper is a surface having magnetic properties such as one formed of soft iron or the like and the movable element is a magnetic head which may consist of a coil wound on a ferrite core, similar to the magnetic head of a drum memory. To measure thickness with this instrument, the object being measured is inserted between the caliper elements and the moveable element lightly engaged therewith. The element is then removed without disturbing the spacing between the fixed and moveable elements and an inductance or impedance reading taken, this reading being indicative of the thickness of the object. As an alternative, if the object being measured is, for example, an insulator whose dielectric constant is known, it need not be removed from the caliper before a reading is taken, provided an appropriate reference curve for that dielectric constant is available.

What is claimed is:

1. A method of spacing a plurality of magnetic heads which may have different free-space inductances the same distance from the surface of a magnetic drum rotor comprising the steps of:

initially measuring the free space inductance of a group of separate reference magnetic heads having different values of free space inductance, said measurement being made after said heads have been backed away from the surface of the drum;

preparing a set of graphs for said group of reference magnetic heads which are physically similar to and which have similar values of free-space inductance as the heads it is desired to position, each of which graphs plots the relationship between a given inductively related parameter of a head and its spacing from said surface;

individually measuring the free space inductance of selected magnetic heads it is desired to position, while the heads are spaced away from the surface of the drum, to determine the graph to which each selected head corresponds; and adjusting the spacing between said selected magnetic head it is desired to position and the surface while measuring the same inductively related parameter thereof until a value of said parameter indicative of the desired spacing, as inidcated by the corresponding graph for a reference head with the same free-space inductance as the magnetic head being positioned, is achieved.

2. A method as set forth in claim 1 wherein said parameter is $[R^2+(\omega L)^2]^{1/2}$, where R=head resistance; L=head inductance, and $\omega$=the angular frequency employed in determining the head inductance reactance.

References Cited

UNITED STATES PATENTS

| | | | |
|---|---|---|---|
| 2,531,414 | 11/1950 | Engvall | 324—34 |
| 1,640,464 | 8/1927 | Mershon | 324—34 |
| 1,889,361 | 11/1932 | Hickok | 324—34 |
| 2,503,720 | 4/1950 | Gieseke | 324—34 |
| 3,147,574 | 9/1964 | La Pointe et al. | 324—34 |
| 3,244,977 | 4/1966 | Folsom | 324—34 |
| 3,371,272 | 2/1968 | Stanton | 324—34 |

FOREIGN PATENTS

| | | | |
|---|---|---|---|
| 904,689 | 8/1962 | Great Britain. | |

OTHER REFERENCES

Stocker, William M.: Measuring Parts in Motion Metalworking Production; July 18, 1962, pp. 79–81.

RUDOLPH V. ROLINEC, Primary Examiner

R. J. CORCORAN, Assistant Examiner

U.S. Cl. X.R.

179—100.2; 340—174.1